United States Patent [19]
Campagnolo

[11] Patent Number: 5,782,712
[45] Date of Patent: Jul. 21, 1998

[54] BICYCLE CHAIN SPROCKET

[75] Inventor: Valentino Campagnolo, Vicenza, Italy

[73] Assignee: Campagnolo S.r.L., Vicenza, Italy

[21] Appl. No.: 882,544

[22] Filed: Jun. 25, 1997

[30] Foreign Application Priority Data

Jun. 25, 1996 [IT] Italy ................... TO96A0539

[51] Int. Cl.$^6$ ................................................ F16H 55/30
[52] U.S. Cl. ................................. 474/152; 474/160
[58] Field of Search ................................. 474/152, 158, 474/160, 163, 164, 165, 903; D12/123, 124

[56] References Cited

U.S. PATENT DOCUMENTS 494,741    4/1893   Forrester ......................... 474/165 X
3,492,883  2/1970   Maeda ............................. 474/160 X
3,550,465  12/1970  Maeda ............................. 474/160 X
4,576,587  3/1986   Nagano ............................ 474/152

Primary Examiner—Thomas R. Hannon
Attorney, Agent, or Firm—Sughrue, Mion, Zinn, Macpeak & Seas, PLLC

[57] ABSTRACT

A sprocket for meshing with a bicycle chain, comprises a central aperture having a multi-lobed profile, which is defined by notches which extend up to in proximity of the outer circumferencial edge, starting from an inner circular edge.

4 Claims, 1 Drawing Sheet

BICYCLE CHAIN SPROCKET

BACKGROUND OF THE INVENTION

The present invention relates to a sprocket to be fixed to the hub of a bicycle rear wheel, for meshing with the bicycle chain, of the type comprising a flat annular body having an outer crown for meshing with the chain, and an inner circular edge including teeth projecting radially inwardly, for coupling of the sprocket on a support fluted body, typically the body of a free wheel associated with the hub of the bicycle rear wheel.

A sprocket of the above indicated type and made according to the prior art is shown in FIG. 1 of the annexed drawings. With reference to this figure, numeral 1 generally designates the sprocket, comprising a flat body, having an outer toothed crown 2, including a plurality of teeth 3 for meshing with the bicycle chain, and an inner circular edge 4 provided with a plurality (typically 8) of teeth 5 which are equiangularly spaced from each other, for coupling with the fluted body of the free wheel associated with the hub of a bicycle rear wheel. The body of sprocket 1 further has apertures 6 for reducing weight.

SUMMARY OF THE INVENTION

The object of the present invention is that of providing a sprocket of the above indicated type, adapted particularly to be used on race bicycles, which has a very reduced weight with respect to that of conventional sprockets, while insuring the requested strength characteristics, with the same material (e.g. steel or light alloy).

In view of achieving this object, the invention provides a sprocket of the type indicated at the beginning of the present description, characterized in that the said inner circular edge of the body of the sprocket is interrupted, between each inner tooth and the adjacent one, by a notch which extends into the body of the sprocket up to near the outer edge thereof, so that the central aperture of the sprocket has a multi-lobed profile.

BRIEF DESCRIPTION OF THE DRAWINGS

Further characteristics and advantages of the present invention will become clear from the following detailed description, given purely by way of non-limiting example, with reference to the appended drawings, in which.

DETAILED DESCRIPTION OF THE INVENTION

Figure 1:
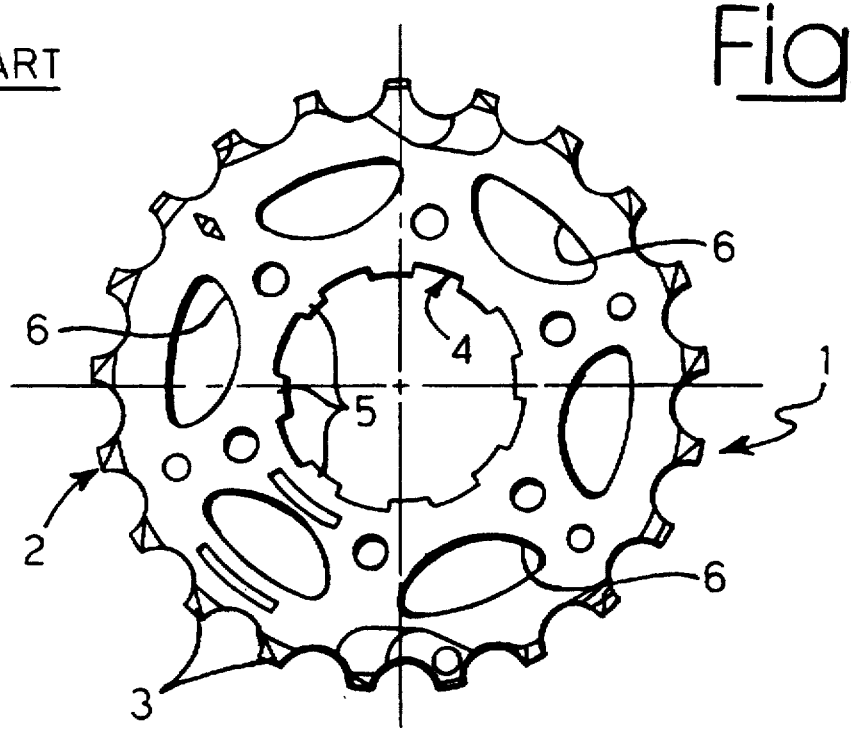
FIG. 1 is a side elevational view of a prior art sprocket.
Figure 2:
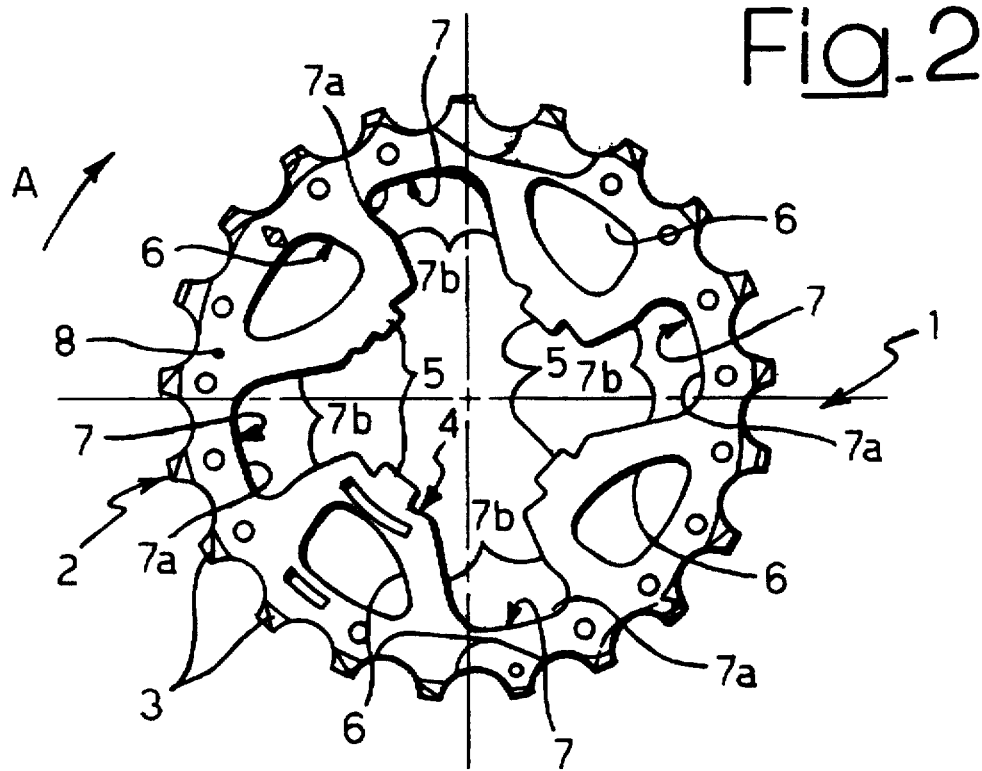
FIG. 2 is a side elevational view of a sprocket according to the present invention.

FIG. 2 of the annexed drawings shows by way of non limiting example a preferred embodiment of the sprocket according to the invention. As shown in this figure, differently from the conventional case shown in FIG. 1, the sprocket of the invention has a halved number of inner teeth 5 (parts in FIG. 2 corresponding to those in FIG. 1 are designated by the same reference numeral). However, the teeth 5 of the sprocket according to the invention shown in FIG. 2 have a height greater than teeth 5 of the known sprocket shown in FIG. 1, in order to provide the requested strength characteristics, notwithstanding the use of a halved number of teeth.

As clearly shown in FIG. 2, the four inner teeth 5 are equiangularly spaced from each other, i.e. they are arranged at right angles relative to each other and between each tooth 5 and the adjacent one the inner circular edge 4 is interrupted by a notch 7 which extends radially into the body of sprocket 1 up to in proximity of the outer edge 2, this notch comprising a bottom portion 7a and two side portions 7b. The bottom portions 7a of the four notches 7 lie on a same circumference which is concentric with the outer edge 2 of the sprocket and substantially close thereto so as to define an outer annular strip 8.

As already indicated above, because of the presence of notches 7, the central aperture of the sprocket takes a multi-lobed profile (a four lobe profile or four-leaved clover profile in the case of the illustrated example).

Studies and tests conducted by the Applicant have brought to defining for each notch 7 the asymmetrical shape which is illustrated in FIG. 2. This shape has indeed been found optimal to provide on one hand the maximum possible weight reduction of the sprocket and on the other hand the required strength for the sprocket body. Due to the presence of notches 7 and their asymmetrical form, also the apertures 6 (which are in a halved number with respect to that of the apertures of the known sprocket shown in FIG. 1) take an asymmetrical profile.

The direction of rotation of the sprocket in use is that indicated by arrow A in FIG. 2.

As clearly apparent from the foregoing description, the invention provides on one hand a substantial reduction of weight of the sprocket with respect to the sprockets made up to now, which renders the sprocket according to the invention particularly adapted to be used on race bicycles. At the same time, the required strength characteristics of the sprocket are insured.

Naturally, while the principle of the invention remains the same, the details of construction and the embodiments may widely vary with respect to what has been described and illustrated purely by way of example, without departing from the scope of the present invention.

What is claimed is:

1. Sprocket to be fixed to the hub of a bicycle rear wheel, for meshing with a bicycle chain, comprising a flat annular body having an outer toothed crown for meshing with the chain and an inner circular edge, including teeth projecting radially inwardly, for coupling of the sprocket on a support fluted body, wherein said inner circular edge is interrupted, between each inner tooth and the adjacent one, by a notch which extends into the body of the sprocket up to in proximity of its outer circumferencial edge, so that the central aperture of said sprocket takes a multi-lobed profile.

2. Sprocket according to claim 1, wherein it has four inner teeth equiangularly spaced from each other and four notches interposed between said teeth.

3. Sprocket according to claim 2, wherein each notch has an asymmetrical profile.

4. Sprocket according to claim 3, wherein in each portion of the body of the sprocket interposed between two adjacent notches there is formed an aperture with an asymmetrical profile.

* * * * *